United States Patent
Yu et al.

(10) Patent No.: US 12,470,689 B2
(45) Date of Patent: Nov. 11, 2025

(54) ELECTRONIC DEVICE AND METHOD FOR TESTING IMAGE STABILIZATION FUNCTION THEREOF

(71) Applicant: ASUSTek COMPUTER INC., Taipei (TW)

(72) Inventors: Yi-Jer Yu, Taipei (TW); Liang-Hsin Chien, Taipei (TW); Yi-Hao Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 18/808,064

(22) Filed: Aug. 18, 2024

(65) Prior Publication Data
US 2025/0080715 A1 Mar. 6, 2025

(30) Foreign Application Priority Data
Sep. 4, 2023 (TW) ................................. 112133453

(51) Int. Cl.
*H04N 17/00* (2006.01)
(52) U.S. Cl.
CPC ................................. *H04N 17/002* (2013.01)
(58) Field of Classification Search
CPC ...................................................... H04N 17/002
See application file for complete search history.

(56) References Cited

U.S. PATENT DOCUMENTS

| | | | |
|---|---|---|---|
| 6,652,104 B2* | 11/2003 | Nishida | H04N 9/3185 353/69 |
| 6,877,863 B2* | 4/2005 | Wood | H04N 9/3185 353/42 |
| 7,070,283 B2* | 7/2006 | Akutsu | H04N 5/74 353/30 |
| 7,182,466 B2* | 2/2007 | Sunaga | H04N 5/74 353/69 |
| 7,270,421 B2* | 9/2007 | Shinozaki | G03B 21/142 353/121 |
| 7,359,575 B2* | 4/2008 | Bassi | G06T 3/18 345/427 |

(Continued)

FOREIGN PATENT DOCUMENTS

| | | |
|---|---|---|
| CN | 113873233 | 12/2021 |
| CN | 114339206 | 4/2022 |
| CN | 115103181 | 9/2022 |

*Primary Examiner* — Michael B. Pierorazio
(74) *Attorney, Agent, or Firm* — JCIPRNET (57) ABSTRACT

An electronic device and a method for testing an image stabilization function thereof are provided. The method is adapted for the electronic device including an image capturing module, and includes the following. While the electronic device is in a static state, a static image of a test pattern is captured through the image capturing module. While the electronic device is in the static state, a vibration simulation signal is provided to the image capturing module. During a period of providing the vibration simulation signal to the image capturing module, a vibration compensation image of the test pattern is captured using an Optical Image Stabilization (OIS) function through the image capturing module. According to a pattern size of the test pattern in the static image and a pattern size of the test pattern in the vibration compensation image, a test result of the OIS function is generated.

16 Claims, 6 Drawing Sheets

(56) References Cited

U.S. PATENT DOCUMENTS

| | | | | |
|---|---|---|---|---|
| 7,441,906 B1* | 10/2008 | Wang | G03B 21/14 | 353/121 |
| 7,782,387 B2* | 8/2010 | Azuma | H04N 25/68 | 359/662 |
| 10,254,523 B2* | 4/2019 | Monk | G02B 21/0008 | |
| 10,816,925 B1* | 10/2020 | Akiyama | G03G 15/55 | |
| 11,513,324 B2* | 11/2022 | Paivansalo | G02B 3/0043 | |
| 11,543,654 B2* | 1/2023 | Paivansalo | G02B 3/0062 | |
| 11,570,334 B2* | 1/2023 | Ni | G03B 3/10 | |
| 11,709,347 B2* | 7/2023 | Brodie | H04N 23/55 | 348/208.7 |
| 11,740,486 B2* | 8/2023 | Ni | G02B 27/646 | 359/557 |
| 2002/0051095 A1* | 5/2002 | Su | H04N 9/3194 | 348/745 |
| 2002/0122161 A1* | 9/2002 | Nishida | H04N 9/3194 | 353/70 |
| 2003/0191836 A1* | 10/2003 | Murtha | H04L 67/02 | 709/224 |
| 2003/0210381 A1* | 11/2003 | Itaki | H04N 5/74 | 353/70 |
| 2004/0156024 A1* | 8/2004 | Matsuda | H04N 9/3185 | 353/70 |
| 2005/0046803 A1* | 3/2005 | Akutsu | H04N 5/74 | 353/69 |
| 2005/0073661 A1* | 4/2005 | Tamura | H04N 9/3194 | 353/70 |
| 2005/0151934 A1* | 7/2005 | Akutsu | G03B 21/147 | 353/69 |
| 2005/0237492 A1* | 10/2005 | Shinozaki | H04N 9/3185 | 353/69 |
| 2006/0098167 A1* | 5/2006 | Sato | G03B 21/26 | 353/35 |
| 2006/0187420 A1* | 8/2006 | Wei | G03B 21/16 | 353/61 |
| 2006/0203207 A1* | 9/2006 | Ikeda | H04N 9/3185 | 353/70 |
| 2007/0008344 A1* | 1/2007 | Medina | G06T 15/10 | 345/647 |
| 2007/0257941 A1* | 11/2007 | Plut | G06F 9/451 | 345/660 |
| 2007/0285626 A1* | 12/2007 | Miyasaka | G03B 21/206 | 353/85 |
| 2009/0278999 A1* | 11/2009 | Ofune | H04N 21/47 | 348/E3.048 |
| 2010/0002123 A1* | 1/2010 | Nozaki | H04N 23/00 | 348/E5.022 |
| 2010/0045942 A1* | 2/2010 | Furui | H04N 9/3194 | 353/69 |
| 2011/0085044 A1* | 4/2011 | Noda | G03B 21/58 | 348/E5.133 |
| 2011/0210979 A1* | 9/2011 | Furui | G03B 37/04 | 345/619 |
| 2011/0234994 A1* | 9/2011 | Uchiyama | H04N 9/3185 | 353/121 |
| 2011/0285971 A1* | 11/2011 | Oka | H04N 9/3185 | 353/70 |
| 2011/0292351 A1* | 12/2011 | Ishii | H04N 9/3185 | 353/69 |
| 2013/0162896 A1* | 6/2013 | Kang | G03B 5/00 | 348/E5.026 |
| 2014/0028906 A1* | 1/2014 | Chen | G03B 5/00 | 348/375 |
| 2014/0139695 A1* | 5/2014 | Kawai | G03B 5/00 | 348/208.99 |
| 2015/0241692 A1* | 8/2015 | Lin | G02B 13/16 | 353/31 |
| 2017/0299952 A1* | 10/2017 | Jorgensen | G03B 21/145 | |
| 2018/0095341 A1* | 4/2018 | Lee | G03B 3/10 | |
| 2018/0158102 A1* | 6/2018 | Choi | G06Q 30/0251 | |
| 2019/0230262 A1* | 7/2019 | Wang | G02B 3/12 | |
| 2020/0073200 A1* | 3/2020 | Eom | G03B 5/00 | |
| 2020/0244888 A1* | 7/2020 | Tsai | H04N 23/6845 | |
| 2020/0379239 A1* | 12/2020 | Li | H04N 23/55 | |
| 2021/0289178 A1* | 9/2021 | Ogishita | H04N 9/3194 | |
| 2022/0206362 A1* | 6/2022 | Ni | H04N 23/55 | |
| 2022/0206363 A1* | 6/2022 | Yan | G03B 30/00 | |
| 2024/0292098 A1* | 8/2024 | Wu | H04N 23/683 | |

* cited by examiner

ELECTRONIC DEVICE AND METHOD FOR TESTING IMAGE STABILIZATION FUNCTION THEREOF

CROSS-REFERENCE TO RELATED APPLICATION

This application claims the priority benefit of Taiwan application serial no. 112133453, filed on Sep. 4, 2023. The entirety of the above-mentioned patent application is hereby incorporated by reference herein and made a part of this specification.

BACKGROUND

Technical Field

The disclosure relates to an electronic device and a method for testing an image stabilization function thereof.

Description of Related Art

Thanks to the advancement of technology, electronic devices with camera functions have become very common nowadays. In order to prevent electronic devices from capturing blurry images when there is a shake, the image stabilization function (also known as anti-blur function or anti-shake function) has been developed to improve the image quality.

Before shipping out electronic devices equipped with optical image stabilization (OIS), generally speaking, the manufacturers will test whether the optical image stabilization function of the electronic devices can function properly. Conventionally, it is necessary to install the electronic device on a shaker to test the performance of the optical image stabilization function. The shaker can vibrate the electronic device and cause the electronic device to capture images during vibration. Furthermore, the vibrating electronic device may capture an image of a test pattern with the optical image stabilization function turned on. Then, whether the optical image stabilization function of the electronic device is qualified is determined according to the blur of the image captured. However, the use of a shaker increases the costs and involves cumbersome testing steps, and there may be testing errors due to precision between shakers.

SUMMARY

An embodiment of the disclosure provides a method for testing image stabilization function, which is adapted for an electronic device including an image capturing module. The image capturing module has an optical image stabilization function, and the method includes the following. While the electronic device is in a static state, a static image of a test pattern is captured through the image capturing module. While the electronic device is in the static state, a vibration simulation signal is provided to the image capturing module. During a period of providing the vibration simulation signal to the image capturing module, a vibration compensation image of the test pattern is captured using the optical image stabilization function through the image capturing module. A test result of the optical image stabilization function is generated according to a pattern size of the test pattern in the static image and a pattern size of the test pattern in the vibration compensation image.

Another embodiment of the disclosure provides an electronic device, which includes an image capturing module and a processor. The image capturing module has an optical image stabilization function and includes a controller. The processor is coupled to the image capturing module and configured to perform the following. While the electronic device is in a static state, a static image of a test pattern is captured through the image capturing module. While the electronic device is in the static state, a vibration simulation signal is provided to the controller of the image capturing module. During a period of providing the vibration simulation signal to the controller of the image capturing module, a vibration compensation image of the test pattern is captured using the optical image stabilization function through the image capturing module. A test result of the optical image stabilization function is generated according to a pattern size of the test pattern in the static image and a pattern size of the test pattern in the vibration compensation image.

Based on the above, in the embodiments of the disclosure, the vibration compensation image of the test pattern is captured using the optical image stabilization function through the image capturing module under the condition that the electronic device is in the static state and the vibration simulation signal is provided to the image capturing module. Although the electronic device is in the static state, the image capturing module performs vibration compensation using the optical image stabilization function in response to the vibration simulation signal to generate the vibration compensation image. The imaging size of the test pattern in the vibration compensation image may be used to evaluate the performance of the optical image stabilization function, which allows the optical image stabilization function of the electronic device to be tested without using a shaker.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Exemplary embodiments of the disclosure will be described in detail hereinafter, examples of which are illustrated in the accompanying drawings. The same reference numerals are used in the drawings and descriptions to refer to the same or similar parts as appropriate. These embodiments, however, are only part of the disclosure and do not reveal all possible implementations of the disclosure. To be more specific, these embodiments are only examples of the device and method within the scope of the disclosure.

Figure 1:
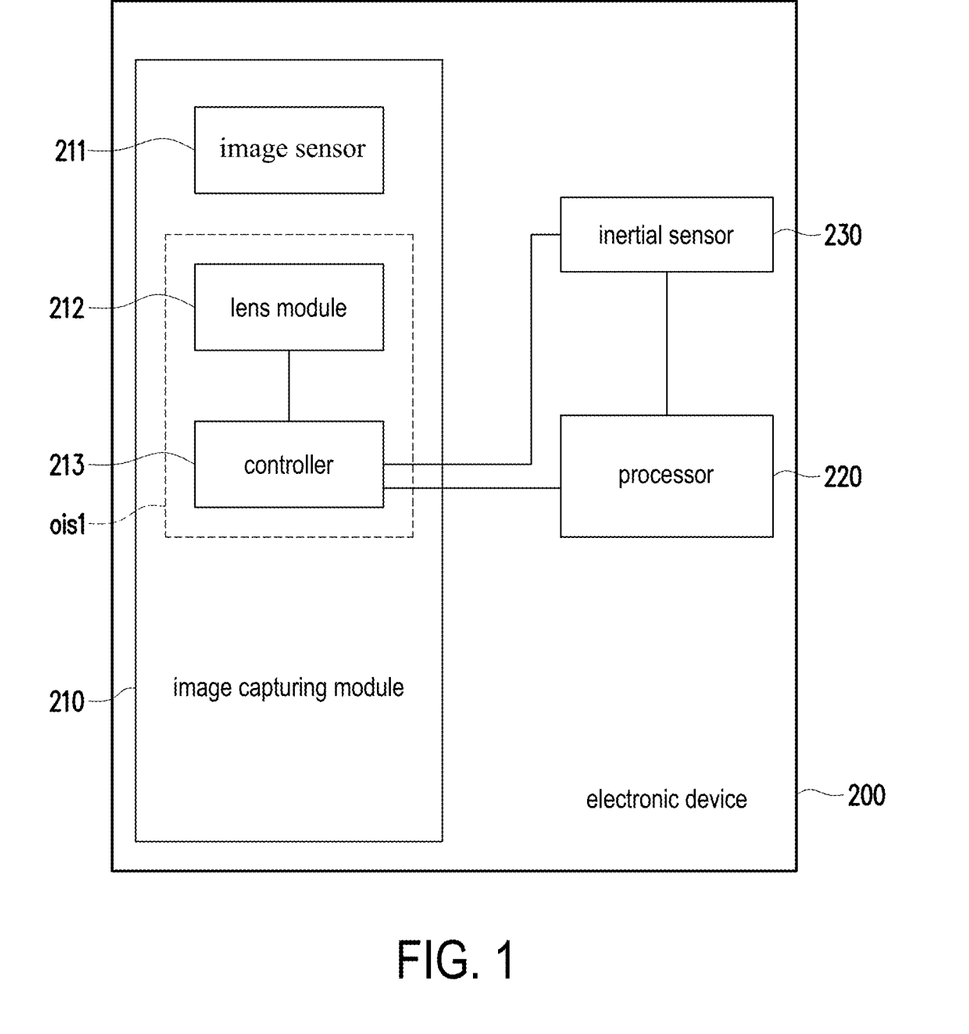
FIG. 1 is a schematic diagram of the electronic device according to an embodiment of the disclosure.

Referring to FIG. 1, an electronic device 200 may be, for example, various types of devices with an image capturing function such as a smart phone, a digital camera, a tablet computer, a game console, an electronic wearable device, and a video recording device, and the type of the electronic device 200 is not limited thereto. It should be noted that the electronic device 200 has an optical image stabilization (OIS) function. The electronic device 200 includes an image capturing module 210, a processor 220, and an inertial sensor 230. That is, the image capturing module 210 has elements related to the OIS function.

In some embodiments, the image capturing module 210 is configured to capture an image or video, and includes an image sensor 211, a lens module 212, a controller 213, and other components.

The image sensor 211 is configured to provide an image sensing function. The image sensor 211 may include a photosensitive element, such as a charge coupled device (CCD), a complementary metal-oxide semiconductor (CMOS), and other elements, but not limited thereto.

An OIS system ois1 of the image capturing module 210 includes the lens module 212 and the controller 213. The lens module 212 is configured to collect light for imaging on the image sensor 211 so as to capture an image. The controller 213 is coupled to the lens module 212 and is, for example, a programmable general-purpose or special-purpose microprocessor, a digital signal processor (DSP), a programmable controller, an application specific integrated circuit (ASIC), a programmable logic device (PLD), other similar devices, or a combination of these devices, for loading and executing software/firmware codes.

Figure 2:
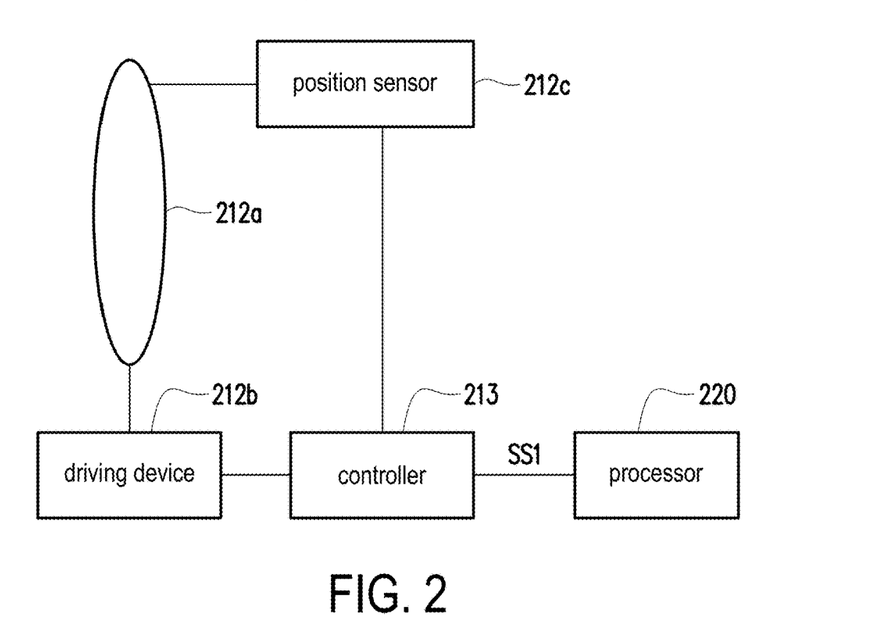
FIG. 2 is a schematic diagram of the optical image stabilization system according to an embodiment of the disclosure.

In more detail, referring to FIG. 2, the lens module 212 includes an optical lens 212a, a driving device 212b, and a position sensor 212c. The controller 213 is coupled to the driving device 212b and the position sensor 212c.

The optical lens 212a is configured for optical path control. The driving device 212b is connected to the optical lens 212a to move the optical lens 212a according to a control signal from the controller 213. The driving device 212b is, for example, a voice coil motor, a micro-electro-mechanical system (MEMS), or the like. A change in the position of the optical lens 212a can be detected by the position sensor 212c. In some embodiments, the position sensor 212c may be implemented by one or more Hall elements. Controlling the driving device 212b to adjust the position of the optical lens 212a in different axial directions stabilizes the images captured by the image capturing module 210 under various motion conditions such as hand shake, head shake, and vehicle vibration.

With the OIS function enabled, when the electronic device 200 shakes, the controller 213 may receive a vibration sensing signal from the inertial sensor 230. Then, the controller 213 may determine compensation movement amounts of the optical lens 212a in different axial directions according to the vibration sensing signal. Thus, the controller 213 may control the driving device 212b to adjust the positions of the optical lens 212a in different axial directions according to the above-mentioned compensation movement amounts, so as to achieve vibration compensation and improve the image blur caused by the vibration.

In some embodiments, when testing the performance of the OIS function of the electronic device 200, the processor 220 provides a vibration simulation signal SS1 to the controller 213 while the electronic device 200 is in a static state. Then, the image capturing module 210 captures an image during a period when the OIS system ois1 operates in response to the vibration simulation signal SS1, and the processor 220 generates a test result of the OIS function based on the imaging result of the captured image. In some other embodiments, after the image capturing module 210 captures an image during the period when the OIS system ois1 operates in response to the vibration simulation signal SS1, the image captured by the image capturing module 210 is sent to an external computing device (such as a computer), and the external computing device generates a test result of the OIS function based on the imaging result of the captured image.

The processor 220 is coupled to the image capturing module 210 and the inertial sensor 230, and is, for example, a central processing unit (CPU), an application processor (AP), a programmable general-purpose or special-purpose microprocessor, a digital signal processor (DSP), an image signal processor (ISP), a graphics processing unit (GPU), other similar devices, integrated circuits, or a combination thereof. In some embodiments, the processor 220 may execute instructions or program codes in a memory to implement the steps of the method for testing the image stabilization function according to the embodiments of the disclosure. The memory may include a volatile storage circuit and a non-volatile storage circuit.

The inertial sensor 230 is configured to sense vibration and motion of the electronic device 200. The inertial sensor 230 may include an accelerometer, a gyroscope, or the like. For example, the inertial sensor 230 may be configured to sense the angular velocity generated by the vibration of the electronic device 200.

Figure 3:
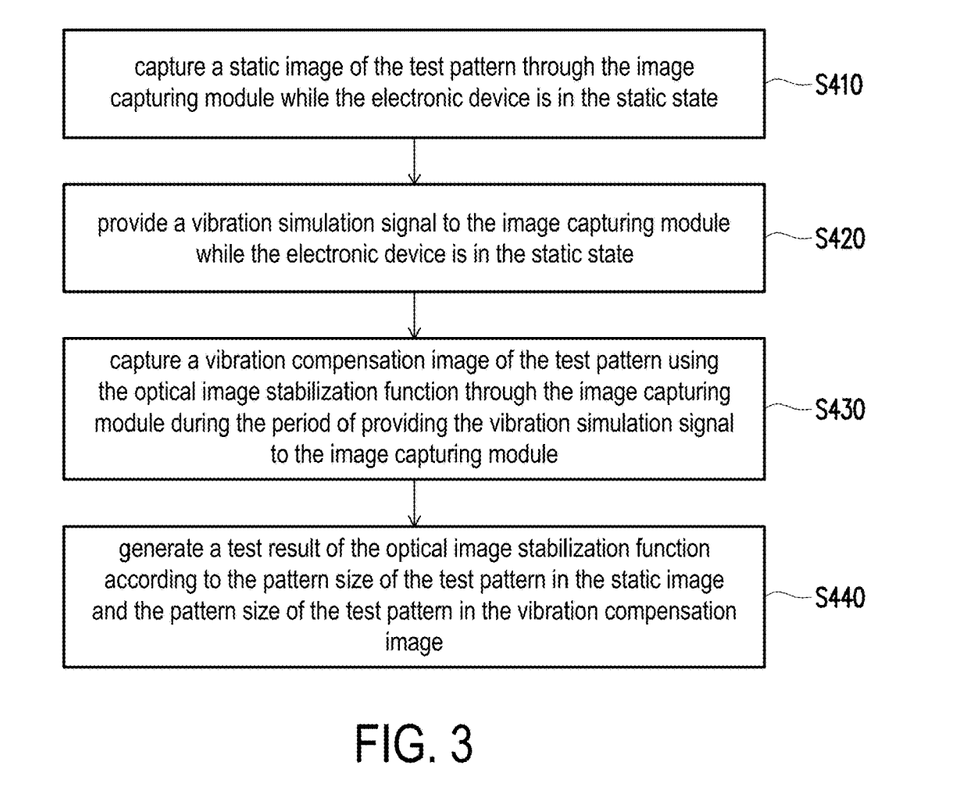
FIG. 3 is a flowchart of the method for testing the image stabilization function according to an embodiment of the disclosure.

FIG. 3 is a flowchart of a method for testing the image stabilization function according to an embodiment of the disclosure. Referring to FIG. 3, the method of this embodiment may be executed by the electronic device 200 in FIG. 1, and the details of each step in FIG. 3 will be described hereinafter with reference to the elements shown in FIG. 1 and FIG. 2.

In step S410, while the electronic device 200 is in the static state, the processor 220 captures a static image of a test pattern through the image capturing module 210. In some embodiments, the image capturing module 210 captures a static image of the test pattern without receiving the vibration simulation signal SS1. In some embodiments, the image capturing module 210 captures a static image during a period when the OIS function is disabled. That is to say, the image capturing module 210 captures a static image when the controller 213 does not control the lens module 212 to perform vibration compensation.

In some embodiments, the test pattern may be presented on a drawing or carriers made of other materials. In some embodiments, the test pattern may be composed of one or more vertical lines and/or horizontal lines, but the disclosure is not limited thereto. From another point of view, the test pattern may be a drawing, a physical object, or a light projected pattern, and the disclosure is not limited thereto.

In step S420, while the electronic device 200 is in the static state, the processor 220 provides the vibration simulation signal SS1 to the image capturing module 210. In some embodiments, the processor 220 may provide the vibration simulation signal SS1 to the controller 213 of the image capturing module 210.

Figure 4:
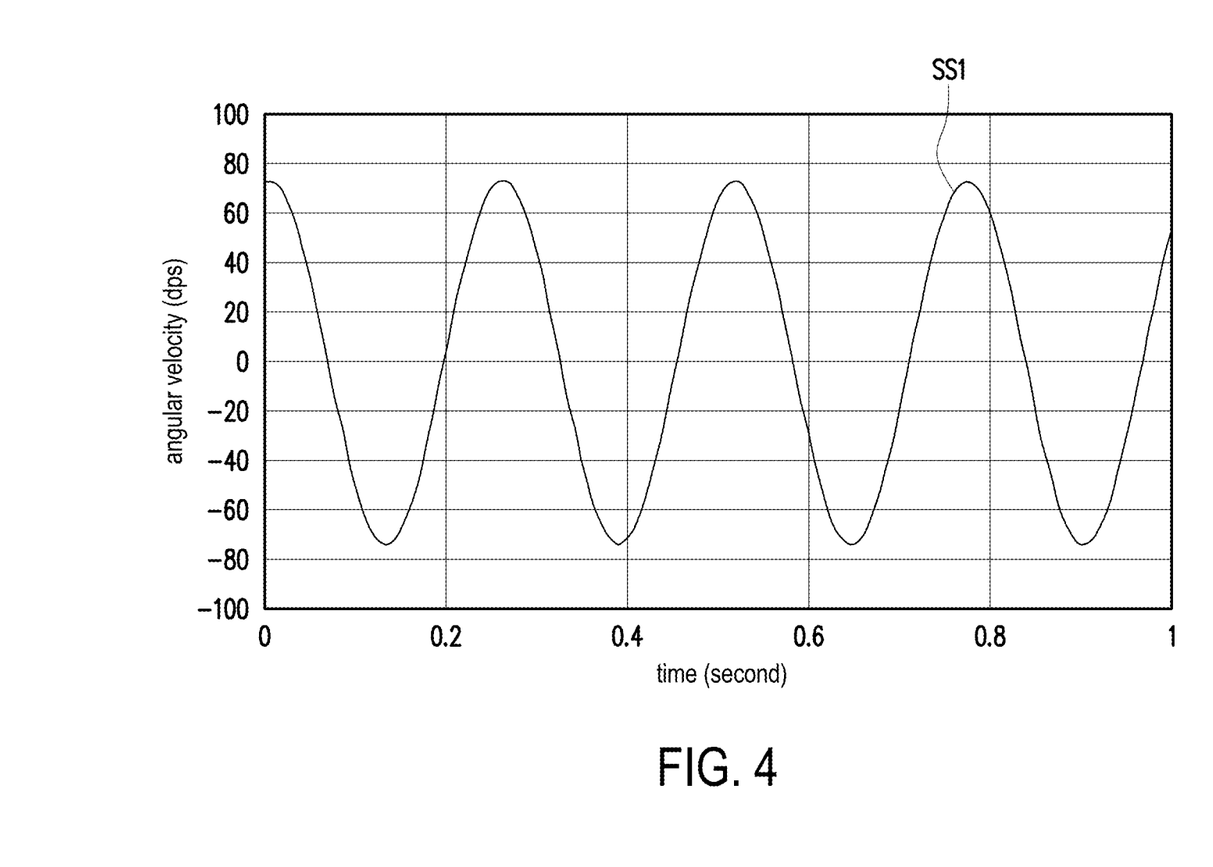
FIG. 4 is a schematic diagram of the vibration simulation signal according to an embodiment of the disclosure.

For example, referring to FIG. 4, the vibration simulation signal SS1 may be an angular velocity signal. The vibration simulation signal SS1 is a signal that simulates the sensing signal output by the inertial sensor 230 (such as a gyroscope) when the electronic device 200 vibrates. However, the vibration frequency and vibration amplitude of the vibration simulation signal SS1 may be set according to actual applications, which are not particularly limited in the disclosure. In addition, the vibration simulation signal SS1 may be a simulation signal determined based on a preset jitter angle.

In step S430, during the period of providing the vibration simulation signal SS1 to the image capturing module 210, the processor 220 captures a vibration compensation image of the test pattern using the OIS function through the image capturing module 210. During the period when the processor 220 provides the vibration simulation signal SS1 to the controller 213 of the image capturing module 210, the processor 220 may enable the OIS function of the image capturing module 210 for the image capturing module 210 to capture the vibration compensation image of the test pattern using the OIS function. More specifically, although the electronic device 200 is in the static state, the OIS system ois1 performs vibration compensation in response to the vibration simulation signal SS1 to capture the vibration compensation image. The operation of the OIS system ois1 performing vibration compensation in response to the vibration simulation signal SS1 is similar to the operation of the OIS system ois1 performing vibration compensation in response to the vibration sensing signal of the inertial sensor 230.

Specifically, the controller 213 determines the compensation movement amounts in different axial directions in response to the vibration simulation signal SS1, and the image capturing module 210 captures the vibration compensation image under the condition that the controller 213 adjusts the position of the optical lens 212a according to the compensation movement amounts. It should be noted that, since the OIS system ois1 performs vibration compensation in response to the vibration simulation signal SS1 while the electronic device 200 is in the static state, the vibration compensation image is blurred.

In step S440, the processor 220 or the external computing device generates a test result of the optical image stabilization function according to the pattern size of the test pattern in the static image and the pattern size of the test pattern in the vibration compensation image. In some embodiments, the test pattern may include at least one line, for example, a black line or a white line. The pattern size of the test pattern in the static image includes the line width of at least one line in the static image, and the pattern size of the test pattern in the vibration compensation image includes the line width of at least one line in the vibration compensation image.

In some embodiments, since the OIS function is tested while the electronic device 200 is in the static state, the image capturing module 210 does not capture the imaging result generated by actual vibration of the electronic device 200. Thus, in some embodiments, the processor 220 or the external computing device may estimate a simulated blur size of the test pattern under the condition that the electronic device 200 is vibrated and the OIS function is disabled, according to the pattern size of the test pattern in the static image and the preset jitter angle corresponding to the vibration simulation signal SS1.

Then, the processor 220 or the external computing device may determine the test result of the OIS function according to the simulated blur size and the pattern size of the test pattern in the vibration compensation image. Specifically, a smaller difference between the simulated blur size and the pattern size of the test pattern in the vibration compensation image indicates a better performance of the OIS function. On the contrary, if the difference between the simulated blur size and the pattern size of the test pattern in the vibration compensation image is too large, it means that the OIS function fails to meet the expectation.

Figure 5:
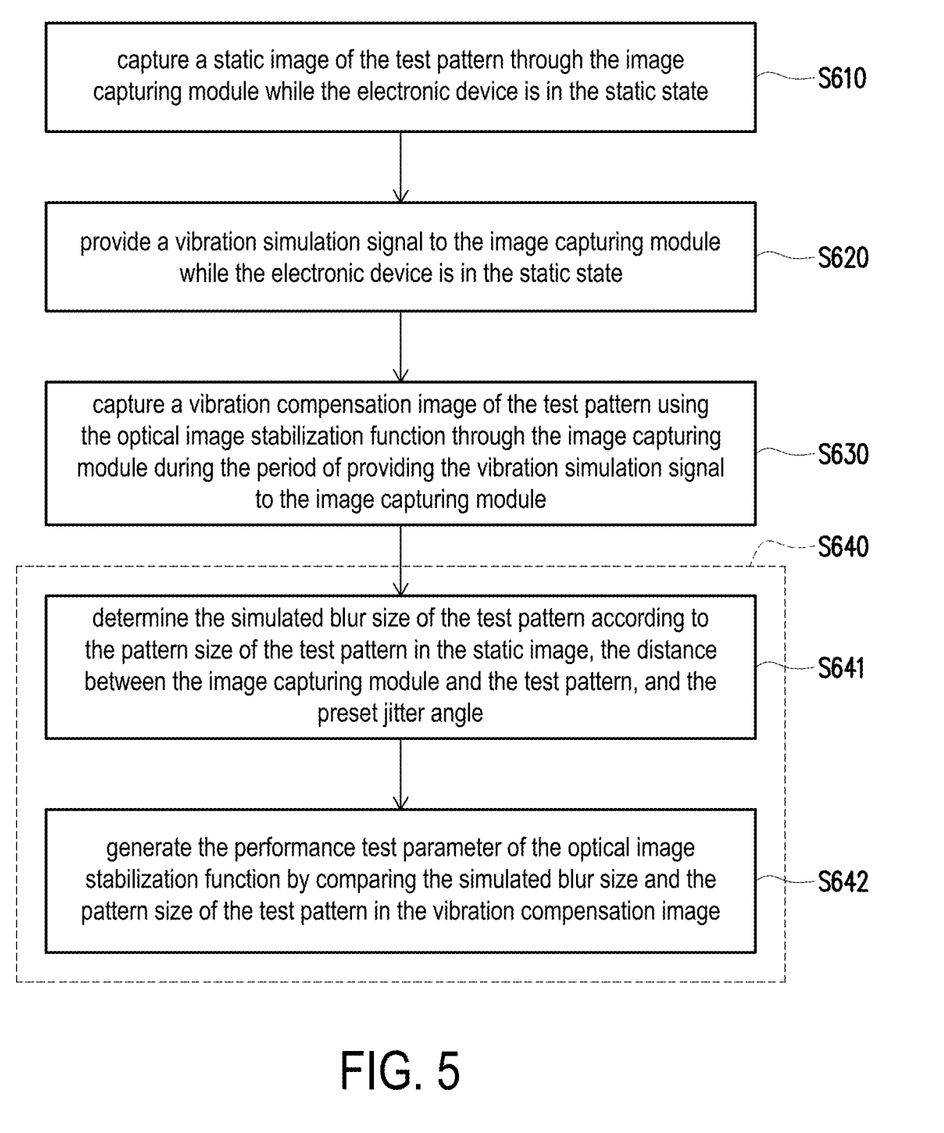
FIG. 5 is a flowchart of the method for testing the image stabilization function according to an embodiment of the disclosure.

FIG. 5 is a flowchart of a method for testing the image stabilization function according to an embodiment of the disclosure. Referring to FIG. 5, the method of this embodiment may be executed by the electronic device 200 in FIG. 1. The details of each step of FIG. 5 will be described hereinafter with reference to the elements shown in FIG. 1 and FIG. 2. Besides, in order to clearly illustrate the principles of the disclosure, the following example is described based on the condition that the test pattern includes a line and the pattern size is the line width.

In step S610, while the electronic device 200 is in the static state, the processor 220 captures a static image of the test pattern through the image capturing module 210. In step S620, while the electronic device 200 is in the static state, the processor 220 provides the vibration simulation signal SS1 to the image capturing module 210. In step S630, during the period of providing the vibration simulation signal SS1 to the image capturing module 210, the processor 220 captures a vibration compensation image of the test pattern using the optical image stabilization function through the image capturing module 210. The details of steps S610 to S630 can be understood with reference to the embodiment in FIG. 4 and thus will not be repeated here.

In step S640, the processor 220 or the external computing device generates a test result of the optical image stabilization function according to the pattern size of the test pattern in the static image and the pattern size of the test pattern in the vibration compensation image. In some embodiments, step S640 may be implemented as steps S641 to S642.

In step S641, the processor 220 or the external computing device determines the simulated blur size of the test pattern according to the pattern size of the test pattern in the static image, a distance between the image capturing module 210 and the test pattern, and the preset jitter angle. The preset jitter angle may be used to determine the vibration amplitude of the vibration simulation signal SS1.

Figure 6:
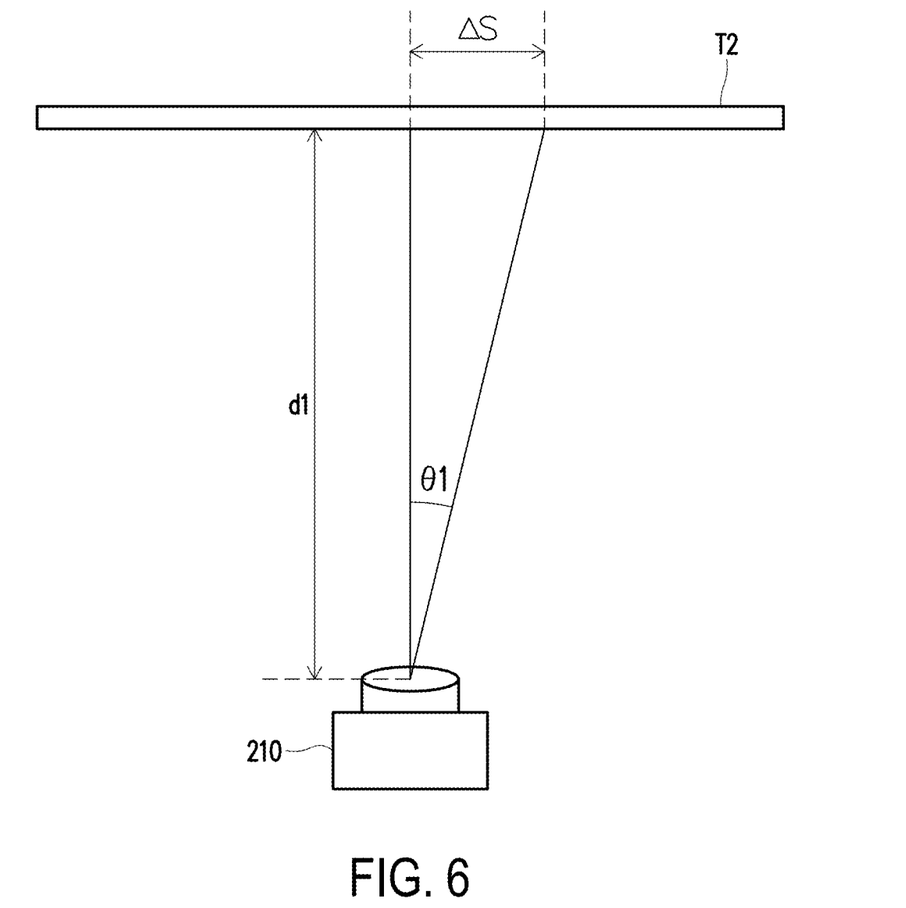
FIG. 6 is a schematic diagram of determining the simulated blur size according to an embodiment of the disclosure.

Referring to FIG. 6, the processor 220 or the external computing device may calculate a jitter offset amount $\Delta S$ according to a tangent value of the preset jitter angle $\theta 1$ and the distance d1 between the image capturing module 210 and the test pattern T2. Then, the processor 220 or the external computing device may obtain the simulated blur size of the test pattern according to the jitter offset amount $\Delta S$ and the pattern size of the test pattern in the static image. Specifically, the processor 220 or the external computing device may obtain the simulated blur size of the test pattern according to the following equation (1) and equation (2).

$$\Delta S = d1 * \tan \theta 1 \qquad (1)$$

$$D_{OISoff} = D_{static} + 2 * \Delta S \qquad (2)$$

where $D_{OISoff}$ is the simulated blur line width of the test pattern (that is, the simulated blur size of the line when the OIS function is disabled); and $D_{static}$ is the line width of the test pattern in the static image (that is, the pattern size of the line in the static image). The true imaging line width of the line in the static image may be obtained by analyzing the pixel values in the static image.

Figure 7A:
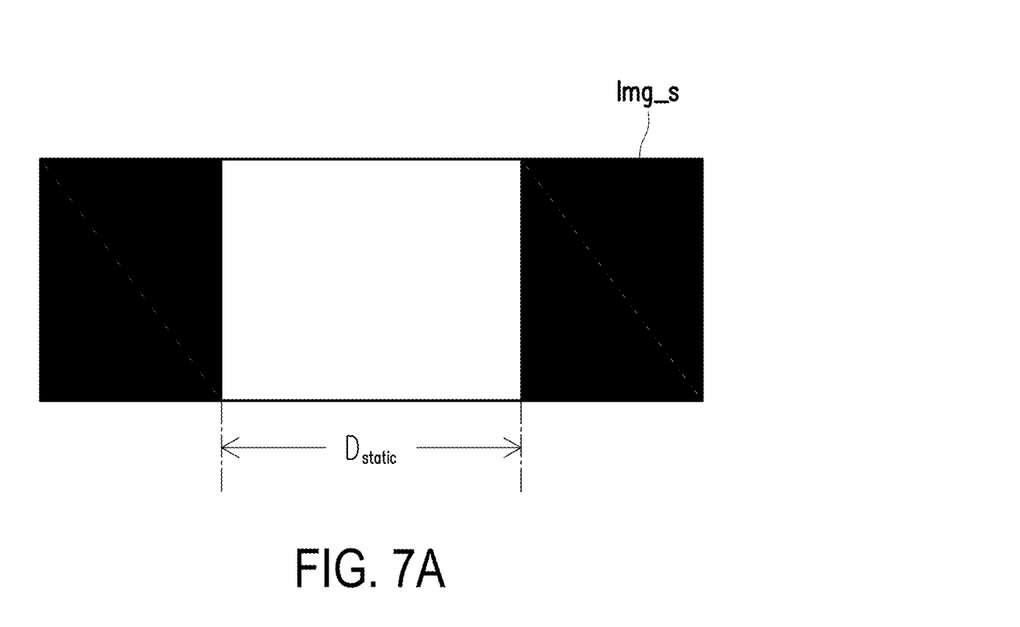
FIG. 7A is a schematic diagram of the static image according to an embodiment of the disclosure.

Referring to FIG. 7A, when the electronic device 200 is in the static state and the OIS function is disabled, the image capturing module 210 captures the static image Img_s. Based on this, the processor 220 or the external computing device may determine the line width $D_{static}$ of the line in the static image Img_s. Then, using equation (1) and equation (2), the processor 220 may calculate $D_{OISoff}$ according to the line width $D_{static}$, the preset jitter angle θ1, and the distance d1.

Next, in step S642, the processor 220 or the external computing device generates a performance test parameter of the OIS function by comparing the simulated blur size and the pattern size of the test pattern in the vibration compensation image. In some embodiments, the performance test parameter of the OIS function may be a suppression ratio (SR) of the OIS function.

In some embodiments, the processor 220 or the external computing device obtains a difference between the simulated blur size and the pattern size of the test pattern in the static image. The processor 220 obtains an absolute difference between the simulated blur size and the pattern size of the test pattern in the vibration compensation image. Then, the processor 220 or the external computing device generates the performance test parameter of the OIS function according to a ratio of the difference to the absolute difference.

Figure 7B:
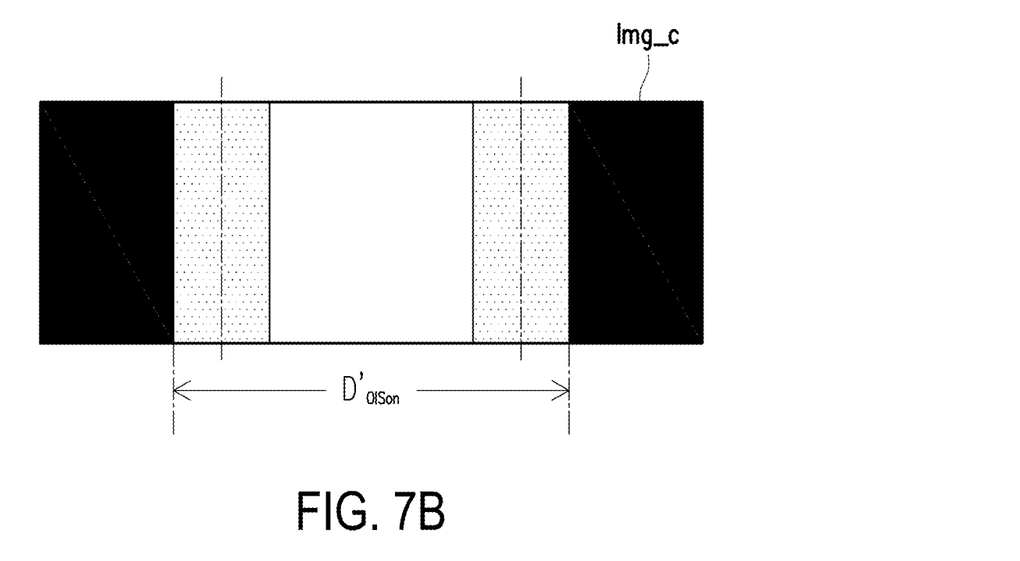
FIG. 7B is a schematic diagram of the vibration compensation image according to an embodiment of the disclosure.

Referring to FIG. 7B, the image capturing module 210 captures a vibration compensation image Img_c under the condition that the electronic device 200 is in the static state, the OIS function is enabled, and the vibration simulation signal SS1 is provided. Although the electronic device 200 is in the static state, when the image capturing module 210 performs vibration compensation in response to the vibration simulation signal SS1, the line width of the line in the vibration compensation image Img_c is $D'_{OISon}$. In FIG. 7B, when the electronic device 200 is in the static state, the gray area (the area with hatching) appearing at the edge of the white line in the vibration compensation image Img_c is generated in response to the movement of the optical lens 212*a*. It should be noted that, in some embodiments, the pixel values of multiple pixels that determine the line width $D'_{OISon}$ of the line in the vibration compensation image Img_c are within a preset range. For example, the pixel values of the pixels may range from a gray scale value A1 to a gray scale value 255. The gray scale value A1 may vary according to actual applications.

In some embodiments, referring to FIG. 7A and FIG. 7B, the processor 220 or the external computing device may, for example, obtain the suppression ratio SR (that is, the performance test parameter) of the OIS function with use of the following equation (3).

$$SR = 20 \times \log \frac{D_{OISoff} - D_{static}}{|D'_{OISon} - D_{OISoff}|} \quad (3)$$

where $D_{OISoff}$ is the simulated blur line width of the test pattern; $D_{static}$ is the line width of the test pattern in the static image; and D'Olson is the line width of the test pattern in the vibration compensation image.

In some embodiments, the processor 220 or the external computing device determines that the OIS function of the electronic device 200 is qualified in response to the performance test parameter being greater than a threshold value. The processor 220 or the external computing device determines that the OIS function of the electronic device 200 is unqualified in response to the performance test parameter being not greater than the threshold value. That is, the processor 220 or the external computing device may compare the performance test parameter with the threshold value, and determine whether the OIS function of the electronic device 200 is qualified based on the comparison result. The threshold value may be set according to actual applications, which is not particularly limited in the disclosure.

To sum up, based on the above, in the embodiments of the disclosure, the vibration compensation image of the test pattern is captured using the optical image stabilization function through the image capturing module under the condition that the electronic device is in the static state and the vibration simulation signal is provided to the image capturing module. The imaging size of the test pattern in the vibration compensation image may be used to evaluate the performance of the optical image stabilization function, which allows the optical image stabilization function of the electronic device to be tested without using a shaker. Accordingly, the costs and processes for testing are saved, the space requirements for testing are lowered, and the adverse influence of the accuracy of the shaker on the test result is reduced.

Although the disclosure has been described with reference to the embodiments above, the above embodiments are not intended to limit the disclosure. Those skilled in the art may make changes and modifications without departing from the spirit and scope of the disclosure. Therefore, the scope of protection of the disclosure shall be defined by the following claims.

What is claimed is:

1. A method for testing image stabilization function, adapted for an electronic device comprising an image capturing module that has an optical image stabilization function, the method comprising:
    capturing a static image of a test pattern through the image capturing module while the electronic device is in a static state;
    providing a vibration simulation signal to the image capturing module while the electronic device is in the static state;
    capturing a vibration compensation image of the test pattern using the optical image stabilization function through the image capturing module during a period of providing the vibration simulation signal to the image capturing module; and
    generating a test result of the optical image stabilization function according to a pattern size of the test pattern in the static image and a pattern size of the test pattern in the vibration compensation image.

2. The method for testing image stabilization function according to claim 1, wherein generating the test result of the optical image stabilization function according to the pattern size of the test pattern in the static image and the pattern size of the test pattern in the vibration compensation image comprises:
    determining a simulated blur size of the test pattern according to the pattern size of the test pattern in the static image, a distance between the image capturing module and the test pattern, and a preset jitter angle; and
    generating a performance test parameter of the optical image stabilization function by comparing the simulated blur size with the pattern size of the test pattern in the vibration compensation image.

3. The method for testing image stabilization function according to claim 2, wherein generating the performance test parameter of the optical image stabilization function by comparing the simulated blur size with the pattern size of the test pattern in the vibration compensation image comprises:
obtaining a difference between the simulated blur size and the pattern size of the test pattern in the static image;
obtaining an absolute difference between the simulated blur size and the pattern size of the test pattern in the vibration compensation image; and
generating the performance test parameter of the optical image stabilization function according to a ratio of the difference to the absolute difference.

4. The method for testing image stabilization function according to claim 2, wherein determining the simulated blur size of the test pattern according to the pattern size of the test pattern in the static image, the distance between the image capturing module and the test pattern, and the preset jitter angle comprises:
calculating a jitter offset amount according to a tangent value of the preset jitter angle and the distance; and
obtaining the simulated blur size of the test pattern according to the jitter offset amount and the pattern size of the test pattern in the static image.

5. The method for testing image stabilization function according to claim 2, wherein generating the test result of the optical image stabilization function according to the pattern size of the test pattern in the static image and the pattern size of the test pattern in the vibration compensation image further comprises:
determining that the optical image stabilization function of the electronic device is qualified in response to the performance test parameter being greater than a threshold value; and
determining that the optical image stabilization function of the electronic device is unqualified in response to the performance test parameter being not greater than the threshold value.

6. The method for testing image stabilization function according to claim 1, wherein the image capturing module captures the static image during a period when the optical image stabilization function is disabled.

7. The method for testing image stabilization function according to claim 1, wherein the test pattern comprises at least one line, the pattern size of the test pattern in the static image comprises a line width of the at least one line in the static image, and the pattern size of the test pattern in the vibration compensation image comprises a line width of the at least one line in the vibration compensation image.

8. The method for testing image stabilization function according to claim 1, wherein pixel values of a plurality of pixels that determine the line width of the at least one line in the vibration compensation image are within a preset range.

9. An electronic device, comprising:
an image capturing module, having an optical image stabilization function and comprising a controller; and
a processor, coupled to the image capturing module and configured to:
capture a static image of a test pattern through the image capturing module while the electronic device is in a static state;
provide a vibration simulation signal to the controller of the image capturing module while the electronic device is in the static state;
capture a vibration compensation image of the test pattern using the optical image stabilization function through the image capturing module during a period of providing the vibration simulation signal to the controller of the image capturing module; and
generate a test result of the optical image stabilization function according to a pattern size of the test pattern in the static image and a pattern size of the test pattern in the vibration compensation image.

10. The electronic device according to claim 9, wherein the processor is configured to:
determine a simulated blur size of the test pattern according to the pattern size of the test pattern in the static image, a distance between the image capturing module and the test pattern, and a preset jitter angle; and
generate a performance test parameter of the optical image stabilization function by comparing the simulated blur size with the pattern size of the test pattern in the vibration compensation image.

11. The electronic device according to claim 10, wherein the processor is configured to:
obtain a difference between the simulated blur size and the pattern size of the test pattern in the static image;
obtain an absolute difference between the simulated blur size and the pattern size of the test pattern in the vibration compensation image; and
generate the performance test parameter of the optical image stabilization function according to a ratio of the difference to the absolute difference.

12. The electronic device according to claim 10, wherein the processor is configured to:
calculate a jitter offset amount according to a tangent value of the preset jitter angle and the distance; and
obtain the simulated blur size of the test pattern according to the jitter offset amount and the pattern size of the test pattern in the static image.

13. The electronic device according to claim 10, wherein the processor is configured to:
determine that the optical image stabilization function of the electronic device is qualified in response to the performance test parameter being greater than a threshold value; and
determine that the optical image stabilization function of the electronic device is unqualified in response to the performance test parameter being not greater than the threshold value.

14. The electronic device according to claim 9, wherein the image capturing module captures the static image during a period when the optical image stabilization function is disabled.

15. The electronic device according to claim 9, wherein the test pattern comprises at least one line, the pattern size of the test pattern in the static image comprises a line width of the at least one line in the static image, and the pattern size of the test pattern in the vibration compensation image comprises a line width of the at least one line in the vibration compensation image.

16. The electronic device according to claim 9, wherein pixel values of a plurality of pixels that determine a line width of at least one line in the vibration compensation image are within a preset range.

* * * * *